(12) United States Patent
Kerr et al.

(10) Patent No.: US 7,026,638 B2
(45) Date of Patent: Apr. 11, 2006

(54) SCANNING APPARATUS USING RADIOGRAPHIC MEDIA

(75) Inventors: Roger S. Kerr, Brockport, NY (US);
Seung-Ho Baek, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 260 days.

(21) Appl. No.: 10/750,115

(22) Filed: Dec. 31, 2003

(65) Prior Publication Data

US 2005/0139795 A1    Jun. 30, 2005

(51) Int. Cl.
*B65H 5/00* (2006.01)
*G03B 42/08* (2006.01)

(52) U.S. Cl. .................. 250/589; 250/580; 250/581; 250/582; 250/583; 250/584; 250/585; 250/586; 250/587

(58) Field of Classification Search ............... 250/589, 250/588, 587, 586, 585, 584, 583, 582, 581, 250/580; 378/182, 188
See application file for complete search history.

(56) References Cited

U.S. PATENT DOCUMENTS

| | | | | |
|---|---|---|---|---|
| 4,506,788 A | * | 3/1985 | Dallas | 206/455 |
| 5,712,486 A | * | 1/1998 | Soltani et al. | 250/484.4 |
| 6,781,144 B1 | * | 8/2004 | Yonekawa | 250/589 |
| 2004/0149930 A1 | * | 8/2004 | Ando | 250/484.4 |

* cited by examiner

*Primary Examiner*—David Porta
*Assistant Examiner*—Christopher Webb
(74) *Attorney, Agent, or Firm*—Buskop Law Group PPC

(57) ABSTRACT

A scanning apparatus (10) for scanning radiographic media (22) comprises a housing (11) with a scanning stage (12) mounted within the housing. A scanning head is mounted on the scanning stage and the scanning stage is adapted for translational movement along an axis (16). An opening (18) in the housing receives a cassette (20) and radiographic media has a latent image (24) disposed in the cassette. The radiographic media has a ferromagnetic end (26) and the cassette consists of a closed box shape having an upper door (28) and a lower door (30). A first magnet (32) is secured to the upper door and a second magnet (34) is secured to the lower door. The polarity of the first magnet is in the same orientation as the polarity of the second magnet. A magnetic latch (36) is mounted within the scanning apparatus to hold the radiographic media at the ferromagnetic end, and the magnetic latch is mounted so that the polarity of the magnetic latch repels the polarity of the first and second magnets. An analog to digital converter (38) communicates with a scanning head (14); a control processing unit (40) communicates with the analog to digital converter; and an output device (42) communicates with the control processing unit.

20 Claims, 4 Drawing Sheets

SCANNING APPARATUS USING RADIOGRAPHIC MEDIA

FIELD OF THE INVENTION

The present invention relates in general to the field of radiographic image scanning and more specifically to a method of removing, transporting, scanning and reinstalling a computer radiographic phosphor media housed within a cassette. The computer radiographic phosphor plate having a latent image to generate a digital image file by means of a scanning

BACKGROUND OF THE INVENTION

In photo-stimulated phosphor imaging systems, a photo-stimulatable phosphor media is removed from a cassette and exposed to an image wise pattern of short wavelength radiation, such as x-radiation, to record a latent image pattern in the photo-stimulatable phosphor media is then reinserted into the cassette. The cassette is then inserted into a scanning apparatus wherein the photo-stimulatable phosphor media is then removed from the cassette by complicated and expensive mechanisms to open the cassette, grip the photo-stimulatable phosphor media and remove the photo-stimulatable phosphor media from the cassette. The photo-stimulatable phosphor media is then translated in a page scan direction. The latent image is read out by stimulating the photo-stimulatable phosphor media with a relatively long wavelength stimulating electromagnetic radiation such as red or infrared light. Upon electromagnetic stimulation, the photo-stimulatable phosphor media releases emitted radiation of an intermediate wavelength such as blue or violet light in proportion to the quantity of short wavelength radiation that was received. To produce a signal useful for electronic image processing, the photo-stimulatable phosphor media is then scanned in a raster pattern by a beam of electromagnetic radiation produced for example by a laser deflected by an oscillating or rotating scanning mirror and the emitted electromagnetic radiation is sensed by a photo-detector such as a photo-multiplier tube to produce the electronic image signal. After the photo-stimulatable phosphor media has been scanned in an image wise pattern the photo-stimulatable phosphor media may be erased using ultra violet light and reinserted back into the cassette to be reused again. What is needed is an inexpensive means for removing, holding and reinserting the photo-stimulatable phosphor media to be scanned.

SUMMARY OF THE INVENTION

Briefly, according to one aspect of the present invention a scanning apparatus for scanning radiographic media comprises a housing with a scanning stage mounted within the housing. A scanning head is mounted on the scanning stage and the scanning stage is adapted for translational movement along an axis. An opening in the housing receives a cassette and radiographic media has a latent image disposed in the cassette. The radiographic media has a ferromagnetic end and the cassette consists of a closed box shape having an upper door and a lower door. A first magnet is secured to the upper door and a second magnet is secured to the lower door. The polarity of the first magnet is in the same orientation as the polarity of the second magnet. A magnetic latch is mounted within the scanning apparatus to hold the radiographic media at the ferromagnetic end, and the magnetic latch is mounted so that the polarity of the magnetic latch repels the polarity of the first and second magnets. An analog to digital converter communicates with the scanning head; a control processing unit communicates with the analog to digital converter; and an output device communicates with the control processing unit.

The invention and its objects and advantages will become more apparent in the detailed description of the preferred embodiment presented below.

BRIEF DESCRIPTION OF THE DRAWINGS

While the specification concludes with claims particularly pointing out and distinctly claiming the subject matter of the present invention, it is believed that the invention will be better understood from the following description when taken in conjunction with accompanying drawings.

DETAILED DESCRIPTION OF THE INVENTION

Figures 1, 2:
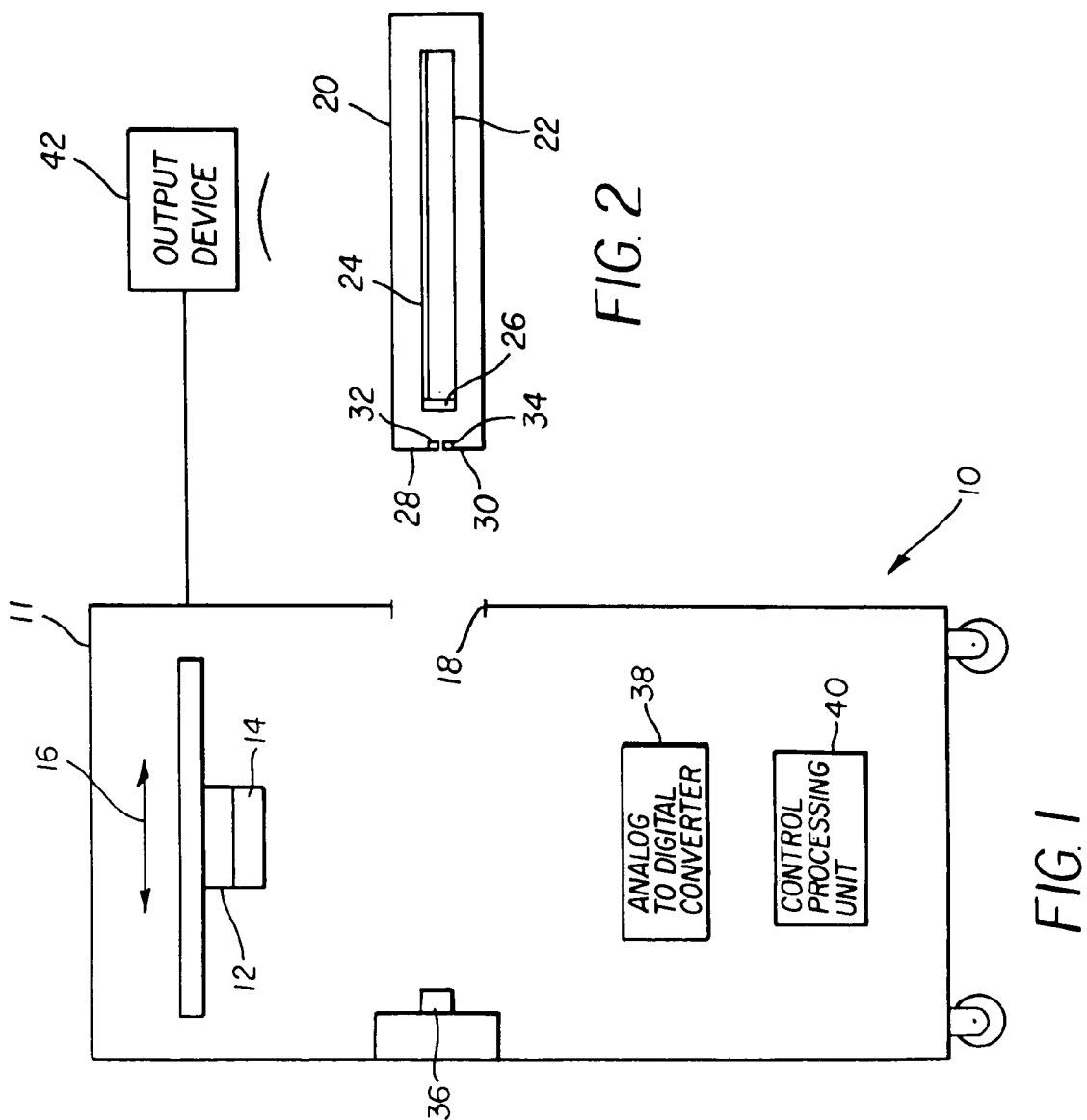
FIG. 1 is a side view of the apparatus for scanning radiographic media according to the invention.
FIG. 2 is a detailed side view of the cassette holding the radiographic media to be scanned in the apparatus of the invention.
Figure 3:
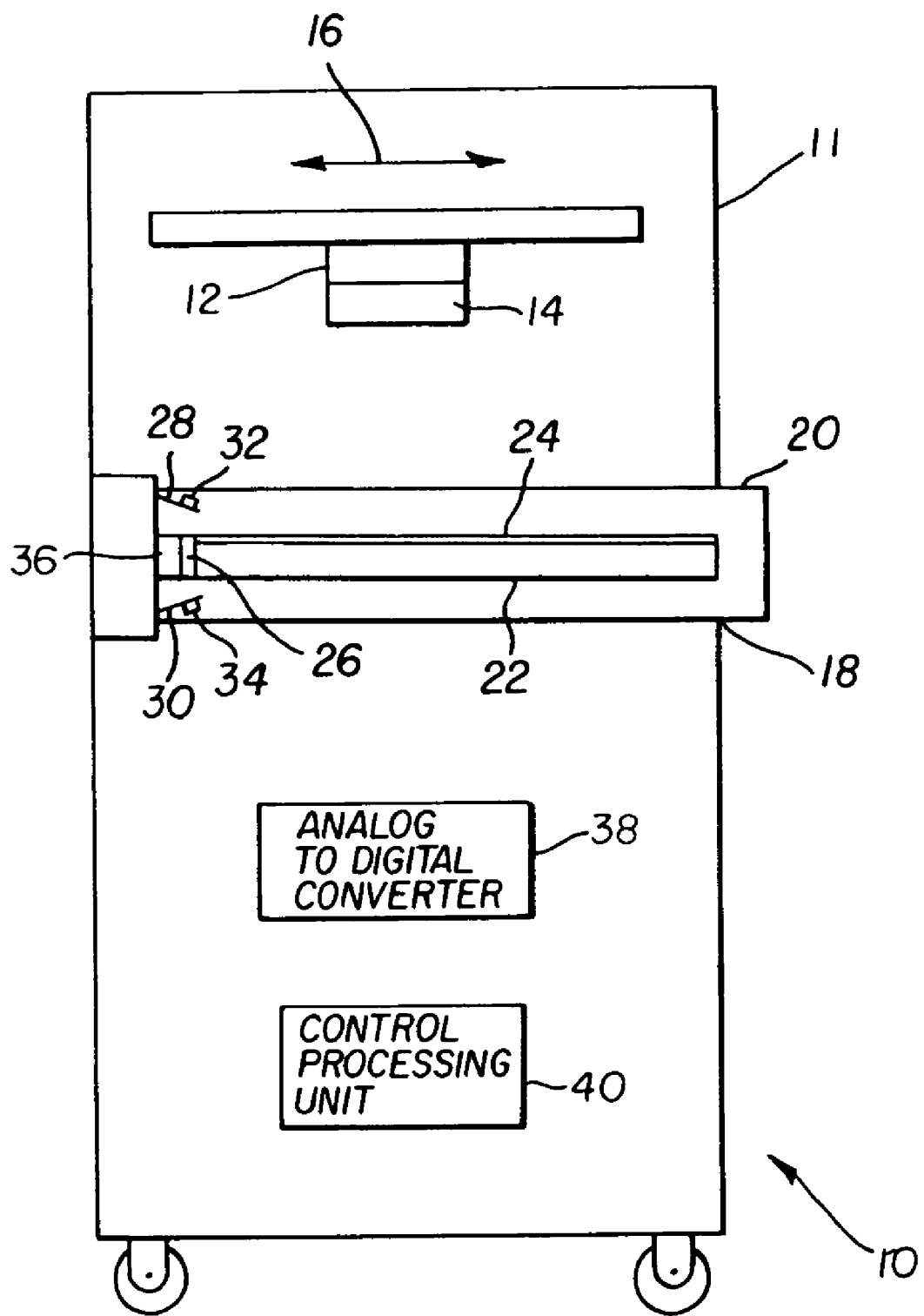
FIG. 3 is a side view of the apparatus holding the cassette with the radiographic media.
Figure 4:
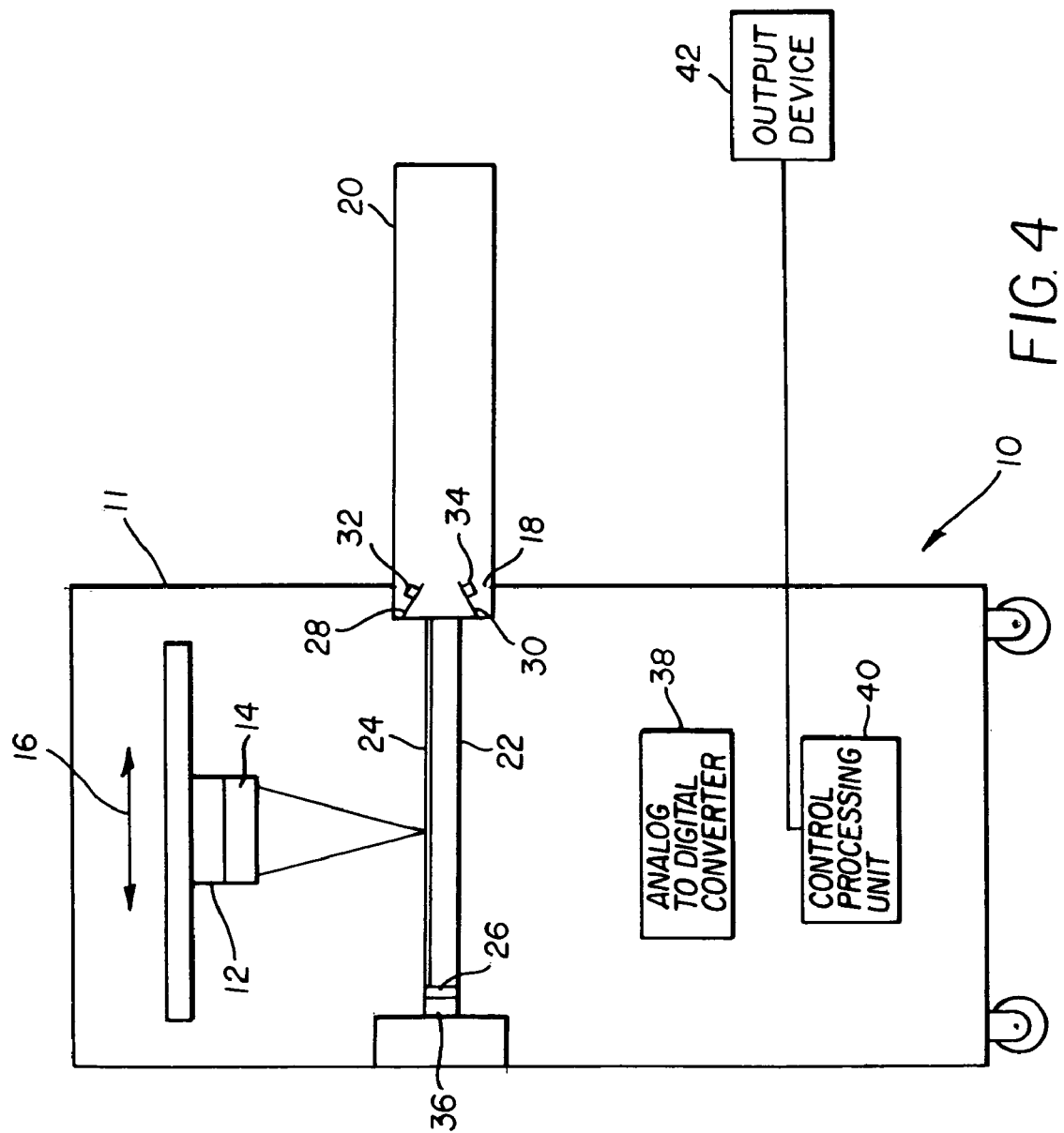
FIG. 4 shows a side view of the apparatus of the invention with the cassette retraced and being scanned.

The present invention will be directed in particular to elements forming part of, or in cooperation more directly with the apparatus in accordance with the present invention. It is to be understood that elements not specifically shown or described may take various forms well known to those skilled in the art.

Referring now to FIGS. 1 through 4 schematic side views of scanning apparatus 10 at various stages are shown for scanning radiographic media 22 comprises a housing 11, mounted within housing 11, a scanning head 14 is mounted on scanning stage 12 with the scanning stage 12 adapted for movement along axis 16 to provide an image wise scan radiographic media 22. An opening 18 is provided in housing 11 for receiving a cassette 20 made of a non-ferrous metal such as aluminum or a resilient plastic such as polypropylene. Disposed within the cassette 20 is radiographic media 22 in the form of a plate screen, sheet or combinations there of having a latent image 24. The radiographic media 22 has a ferromagnetic end 26, the cassette 20 consists of a closed box shape having an upper door 28, and a lower door 30 a first magnet 32 is secured to the upper door 28. A second magnet 34 is secured to the lower door 30. The polarity of the first magnet 32 is in the same orientation as the polarity of the second magnet 34. A magnetic latch 36 is mounted within the scanning apparatus 10 to hold the radiographic media 22 at the ferromagnetic end 26. The magnetic latch 36 is mounted such that the polarity of the magnetic latch 34 repels the polarity of the first magnet 32 and second magnet 34. An analog to digital converter 38 is in communication with the scanning head 14. A control processing unit 40 communicates with the analog to digital converter 38; and an output device 42 communicates with the control processing unit 40.

A scanning apparatus 10 for scanning radiographic media 22 comprises a housing 11 for the scanning apparatus. A scanning stage 12 is mounted within the housing. A scanning head 14 is mounted on the scanning stage 12, and the scanning stage 12 is adapted for translational movement along an axis 16 to provide a page wise scan of the radiographic media 22; An opening 18 in the housing 11 receives a cassette 20 having radiographic media 22 which has a latent image 24 disposed within the cassette 20. The cassette 20 consists of a closed box having an upper door 28 and a lower door 30 that can be opened using a mechanical device or pin. A magnetic latch 36 that may be an electromagnet or a permanent magnet made of a rare earth material mounted within the scanning apparatus 10 to hold the radiographic media 22 at the ferromagnetic end 26. An analog to digital converter 38 communicates with the scanning head 14; a control processing unit 40 communicates with the analog to digital converter 38; and an output device 42 communicates with the control processing unit 40.

A method for scanning radiographic media 22 wherein the radiographic media 22 is a phosphorous plate and comprises at least one ferromagnetic end 26. A cassette 20 is inserted into a scanning apparatus 10, wherein the cassette 20 is comprised of an upper door 28 and lower door 30. The upper door 28 has a first magnet 32 and the lower door 30 has a second magnet 34 and the polarity of the first magnet 32 is in the same orientation as the polarity of the second magnet 34. The cassette 20 comprises radiographic media 22 having at least one ferromagnetic end 26. A magnetic latch 36 is mounted within the scanning apparatus 10 to hold the radiographic media 22 at the ferromagnetic end 26, and to open the upper door 28 and lower door 30, wherein the magnetic latch 36 is mounted so that the polarity of the magnetic latch 36 repels the polarity of the first magnet 32 and second magnet 34. The cassette 20 is retracted while keeping the radiographic media 22 engaged with the magnetic latch 36. The radiographic media 22 is scanned with a scanning head 14 to stimulate an area 50. Emitted light 52 is collected from the radiographic media 22 as a result of stimulation by the scanning head 14. The collected light is transferred to a light detector 48 forming a signal. The signal is transferred to an analog to digital converter 38 forming a digital signal. The digital signal is transferred to a control processing unit 40, and communicates the transferred digital signal to an output device 42. The scanned radiographic media 22 is removed by reinstalling the radiographic media 22 into the cassette 20, and the cassette 20 is removed.

A method for scanning radiographic media 22 wherein the radiographic media 22 comprises at least one ferromagnetic end 26. A cassette 20 is inserted into scanning apparatus 10, wherein the cassette 20 is comprised of upper door 28 and lower door 30. The cassette 20 comprises radiographic media 22 having at least one ferromagnetic end 26. A magnetic latch 36 is mounted within the scanning apparatus 10 to hold the radiographic media 22 at the ferromagnetic end 26. The cassette 20 is retracted while keeping the radiographic media 22 engaged with the magnetic latch 36. The radiographic media 22 is scanned with a scanning head 14. Emitted light 52 is collected from the radiographic media 22 as a result of stimulation by the scanning head 14. The collected light is transferred to a light detector 48 forming a signal; transferring the signal to an analog to digital converter 38 forming a digital signal. The digital signal is transferred to a control processing unit 40, and communicates the transferred digital signal with an output device 42. The radiographic media 22 is reinstalled into the cassette. The cassette 20 is removed from the scanning apparatus 10.

Figure 5:
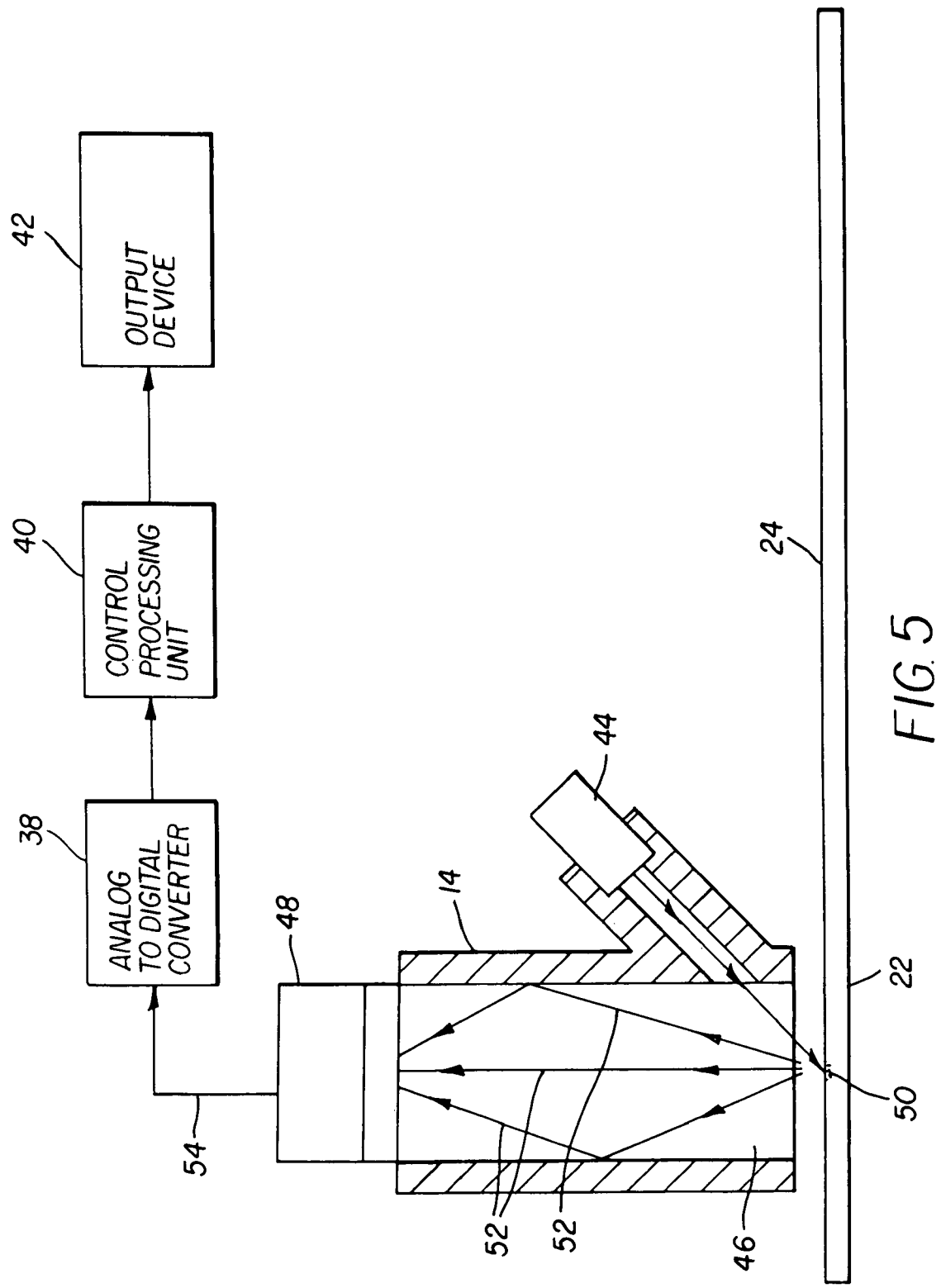
FIG. 5 is a side view of a scanning head usable in the invention.

FIG. 5 shows a scanning head 14 that could be used in scanning the radiographic media 22 having a latent image 24. The scanning head 14 comprises a light source 44 for stimulating an area 50 of the radiographic media 22 to emitted light 52, a light collector 46 to collect the emitted light 52, and a light detector 48 to convert the light to a signal 54 that is sent to a analog to digital converter 38 then onto a control processing unit 40 and onto an output device 42 for display, printing or storage.

The invention has been described in detail with particular reference to certain preferred embodiments thereof, but it will be understood that variations and modifications can be effected within the scope of the invention.

PARTS LIST 10 scanning apparatus
11 housing
12 scanning stage
14 scanning head
16 axis
18 opening
20 cassette
22 radiographic media
24 latent image
26 ferromagnetic end
28 upper door
30 lower door
32 first magnet
34 second magnet
36 magnetic latch
38 analog to digital converter
40 control processing unit
42 output device
44 light source
46 light collector
48 light detector
50 area
52 emitted light
54 signal

What is claimed is:

1. A scanning apparatus for scanning radiographic media comprising:
    a) a housing;
    b) a scanning stage mounted within the housing;
    c) a scanning head mounted on the scanning stage, wherein the scanning stage is adapted for translational movement along an axis;
    d) an opening in the housing for receiving a cassette;
        i) radiographic media having a latent image disposed in the cassette, wherein the radiographic media has a ferromagnetic end, and wherein the cassette consists of a closed box shape having an upper door and a lower door;
        ii) a first magnet secured to the upper door;
        iii) a second magnet secured to the lower door, wherein the polarity of the first magnet is in the same orientation as the polarity of the second magnet;
        iv) a magnetic latch mounted within the scanning apparatus to hold the radiographic media at the ferromagnetic end, wherein the magnetic latch is mounted so that the polarity of the magnetic latch repels the polarity of the first and second magnets;
    e) an analog to digital converter in communication with the scanning head;
    f) a control processing unit in communication with the analog to digital converter; and
    g) an output device in communication with the control processing unit.

2. The scanning apparatus of claim 1 wherein the radiographic media is a plate, a screen, a sheet, or combinations thereof.

3. The scanning apparatus of claim 1 wherein the radiographic media is a phosphorous plate.

4. The scanning apparatus of claim 1 wherein the cassette consists of a non-ferrous metal.

5. The scanning apparatus of claim 1 wherein the cassette consists of a resilient plastic.

6. The scanning apparatus of claim 1 wherein the magnetic latch is a rare earth magnet.

7. The scanning apparatus of claim 1 wherein the magnetic latch is an electromagnet.

8. The scanning apparatus of claim 1 wherein the scanning head comprises a light source for stimulating an area of the radiographic media to emit light, a light collector to collect the emitted light, and a light detector to convert the collected light to a signal.

9. A scanning apparatus for scanning radiographic media comprising:
   a) a housing for the scanning apparatus;
   b) a scanning stage mounted within the housing;
   c) a scanning head mounted on the scanning stage, wherein the scanning stage is adapted for translational movement along an axis;
   d) an opening in the housing for receiving a cassette;
      i) radiographic media having a latent image disposed in the cassette, wherein the radiographic media has a ferromagnetic end, and wherein the cassette consists of a closed box having an upper door and a lower door;
      ii) a magnetic latch mounted within the scanning apparatus to hold the radiographic media at the ferromagnetic end;
   e) an analog to digital converter in communication with the scanning head;
   f) a control processing unit in communication with the analog to digital converter; and
   g) an output device in communication with the control processing unit.

10. The scanning apparatus of claim 9 wherein the doors open and close using a non-magnetic mechanical device.

11. The scanning apparatus of claim 10 wherein the non-magnetic mechanical device is a pin.

12. The scanning apparatus of claim 9 wherein the radiographic media is a plate, a screen, or combinations thereof.

13. The scanning apparatus of claim 9 wherein the radiographic media is a phosphorous plate.

14. The scanning apparatus of claim 9 wherein the cassette consists of a non-ferrous metal.

15. The scanning apparatus of claim 9 wherein the cassette consists of a resilient plastic.

16. The scanning apparatus of claim 9 wherein the magnetic latch is a rare earth magnet.

17. The scanning apparatus of claim 9 wherein the magnetic latch is an electromagnet.

18. The scanning apparatus of claim 9 wherein the scanning head comprises a light source for stimulating an area of the radiographic media to emit light, a light collector to collect the emitted light, and a light detector to convert the collected light to a signal.

19. A method for scanning radiographic media wherein the media comprises at least one ferromagnetic end, the method comprising the steps of:
   a) inserting a cassette into a scanning apparatus, wherein the cassette further comprises first and second doors, wherein the first door has a first magnet and the second door has a second magnet and the polarity of the first magnet is in the same orientation as the polarity of the second magnet, and wherein the cassette comprises radiographic media having at least one ferromagnetic end;
   b) using a magnetic latch mounted within the scanning apparatus to hold the radiographic media at the ferromagnetic end, and to open the first and second doors, wherein the magnetic latch is mounted so that the polarity of the magnetic latch repels the polarity of the first and second magnets;
   c) retracting the cassette while keeping the radiographic media engaged with the magnetic latch;
   d) scanning the radiographic media with a scanning head to stimulate an area;
   e) collecting light emitted from the radiographic media as a result of stimulation by the scanning head;
   f) transferring the collected light to a light detector forming a signal;
   g) transferring the signal to an analog to digital converter forming a digital signal;
   h) transferring the digital signal to a control processing unit;
   i) communicating the transferred digital signal with an output device;
   j) removing the scanned radiographic media by reinstalling the radiographic media into the cassette; and
   k) removing the cassette.

20. A method for scanning radiographic media wherein the media comprises at least one ferromagnetic end, the method comprising the steps of:
   a) inserting a cassette into a scanning apparatus, wherein the cassette further comprises first and second doors, and wherein the cassette comprises radiographic media having at least one ferromagnetic end;
   b) using a magnetic latch mounted within the scanning apparatus to hold the radiographic media at the ferromagnetic end;
   c) retracting the cassette while keeping the radiographic media engaged with the magnetic latch;
   d) scanning the radiographic media with a scanning head;
   e) collecting light emitted from the radiographic media as a result of stimulation by the scanning head;
   f) transferring the collected light to a light detector forming a signal;
   g) transferring the signal to an analog to digital converter forming a digital signal;
   h) transferring the digital signal to a control processing unit;
   i) communicating the transferred digital signal with an output device;
   j) removing the scanned radiographic media by reinstalling the radiographic media into the cassette; and
   k) removing the cassette.

* * * * *